April 25, 1967 R. E. SCHAFFER 3,316,532
AIRCRAFT FOLLOW-UP SERVOMECHANISM INDICATING APPARATUS
Filed July 20, 1964

INVENTOR.
RICHARD E. SCHAFFER
BY
*S.C.Yeaton*
ATTORNEY

United States Patent Office 3,316,532
Patented Apr. 25, 1967

3,316,532
AIRCRAFT FOLLOW-UP SERVOMECHANISM INDICATING APPARATUS
Richard E. Schaffer, Scottsdale, Ariz., assignor to Sperry Rand Corporation, Great Neck, N.Y., a corporation of Delaware
Filed July 20, 1964, Ser. No. 383,863
3 Claims. (Cl. 340—27)

ABSTRACT OF THE DISCLOSURE

A feedback servomechanism in which an output member is controlled to follow an input member as the input member departs from a datum wherein the normal position error signal having a predetermined gradient is modified by a further output member position signal having a different gradient whereby the null position of the output member relative to the datum position for given positions of the input member relative to the datum position may be varied.

---

This invention relates in general to improvements in servomechanisms and in particular the improvement that adapts servomechanisms for greater (or lesser) output displacements for given input disturbances. That is, for identical sensitivities to a given input signal, the invention allows a servo in one instance to drive to a first displacement and in a second instance to drive to a second larger displacement, and this without intricate variable gear reduction apparatus or variable component excitation.

Of particular interest this invention may be applied to indicator instruments, whereby coarse control of say a vehicle may be made at some times, and then at other times fine control of the vehicle may be had. In other words, when coarse control of the vehicle is desired, the invention will result in a pointer (or the like) of an indicator moving slightly for an input disturbance; for fine control the pointer for that same input disturbance will move greatly. This means tighter vehicle control in the latter case than in the former.

To provide the invention, use is made not of one servo repeatback device, but of two, and each repeatback device in the usual case has a signal gradient per the servo output unlike that of the other. The first of the two repeatback devices provides an algebraic summation of the servo input disturbance and the servo output displacement. Depending then on whether the magnitude of the servo output displacement is desired to be changed or not, the output of the second device is respectively summed or not with the output of the first device to provide a control signal for driving the servo. In-phase summing of the outputs of the repeatback devices results in a greater output servo displacement for a given input disturbance than when only the first of such devices is employed within the servo loop; an out-of-phase summation of the signals from the two repeatback devices results in a smaller servo displacement for the given input disturbance than when only the first of such devices is employed within the servo loop. Depending on the relative magnitudes of the two signal gradients for the servo output, the servo output displacement may be expanded or reduced accordingly.

Where the invention at present finds its greatest utility is in conjunction with servo apparatus employing synchro control transformers and synchro transmitters respectively for input and output purposes. (While the invention may be employed with a servo employing a feedback potentiometer, its use here is not as likely since a simple adjustment of the voltage applied to the feedback potentiometer will result in the desired expansion or reduction of the servo output displacement.) Such synchro-oriented servos are for example typically used with pitch attitude indicators for aircraft. Here a vertical gyroscope attitude reference having (in the usual case) a synchro data transmitter for producing a signal representing the angular displacement between its sensitive element and its case applies such signal to a control transformer having a signal gradient of X volts per degree of angular displacement. The rotor of the control transformer applies its output signal of X volts per degree through a summing circuit to a servo adapted to drive the pitch attitude bar of an indicator. Mechanical feedback from the output of the servo then operates to cancel the input signal to the servo by driving the rotor of the control transformer to a null position. When the servo stops driving, i.e., when its input signal is cancelled, the pitch bar of the indicator hangs off from a reference position in proportion to craft pitch attitude. By driving the rotor of a synchro transmitter (in addition to driving the rotor of the control transformer) a signal may be produced having a signal gradient of Y volts per degree of servo output. Now (as will be shown later) by adding the signal Y volts per degree to the signal X volts per degree and applying such sum signal to drive the indicator servo, the movement of the indicator bar may be amplified. Hence, in cross country flight where loose control of a craft is all that is necessary, the above-mentioned summation is not made; however, during a landing maneuver where tight control of a craft is absolutely desired, the summation is made, and attendant upon this are large displacements of the indicator bar for slight changes in craft pitch attitude.

A principal object of the invention is to provide improvements to servo apparatus.

Another object of the invention is to provide a means for modifying a servo to vary its output displacement for a given input disturbance.

Another object of the invention is to provide apparatus for modifying the display of a servo driven indicator.

Another object of the invention is to provide apparatus for selectively increasing or decreasing the amount an indicator reference moves for a given input disturbance.

Another object of the invention is to provide an indicator capable of selectively having its reference moved more, or less, in response to a given input disturbance.

Another object of the invention is to provide a pitch attitude indicator capable of selectively having its reference moved more, or less, in response to a given input pitch attitude disturbance.

The invention will be described with reference to the figures wherein.

Figure 1:
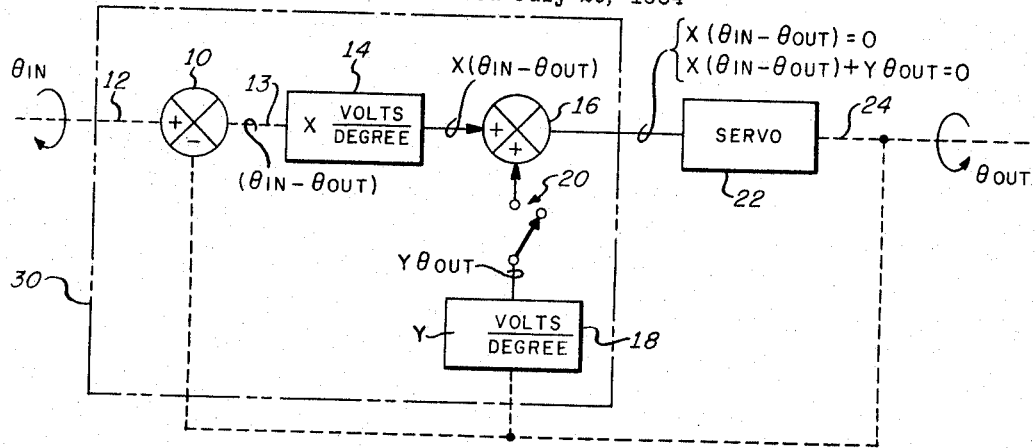
FIG. 1 is a general block diagram of apparatus embodying the invention.

Referring to FIG. 1, a signal $\theta_{in}$ in the form of a mechanical disurbance is applied to a differential device 10 via an input member 12. The differential device 10 has its mechanical output signal (appearing on its output member 13) applied to a transducer 14 adapted to convert its received mechanical signal to an electrical equivalent thereof. A summing circuit 16 adapted to receive continually the signal from the transducer 14 and being also adapted to receive the output signal from a second transducer 18 when a switch 20 is closed, applies its output signal to a servo 22, which servo it is understood includes an amplifier, a motor and suitable damping means. The output shaft 24 of the servo 22 is mechanically linked both to the differential device 10 and to the transducer 18, whereby such latter element converts the servo output displacement $\theta_{out}$ to a representative electrical signal. The transducer 14 is such that it will produce X volts for each unit (degree) of the mechanical signal ($\theta_{in} - \theta_{out}$) appearing on the member 13; the transducer 18 will produce Y volts for each unit (degree) of mechanical signal $\theta_{out}$ appearing on the servo output shaft 24. Hence, when the switch 20 is open, the signal $X(\theta_{in} - \theta_{out})$ is applied to the servo 22 which then drives to cancel such signal; when the switch 20 is closed the servo drives to cancel the signal $X(\theta_{in} - \theta_{out}) + Y\theta_{out}$.

That the above arrangement of components will provide amplification (or not) of the servo output displacement may be appreciated from the following: When the servo 22 runs to cancel the signal $X(\theta_{in} - \theta_{out})$, i.e., when the switch 20 is open, $\theta_{out}$ will eventually be made to equal $\theta_{in}$. However, when the switch 20 is closed, the servo 22 runs until $$\theta_{out} = \frac{X}{X-Y}\theta_{in}$$

With the signal gradient X being, for example, one volt per degree and the signal gradient Y being 1.5 volts per degree, $$\theta_{out} = \frac{1}{1-1.5}\theta_{in} = 2\theta_{in}$$

Obviously, other amplifications of displacement output are also possible, e.g., if X is 1.5 volts per degree and Y is 1 volt per degree, the expression $$\theta_{out} = \frac{X}{X-Y}\theta_{in}$$

reduces to $\theta_{out} = 3\theta_{in}$, etc.

If, instead of increasing the displacement of the servo 22 output shaft 24, it is desired to reduce same for a given input disturbance, all that is needed is to change the circuit 16 from a summing element to a differential device. In the usual case, this merely means reversal of one pair of input leads. That is, the servo 22 will now respond either to the signal $X(\theta_{in} - \theta_{out})$ or the signal $$X(\theta_{in} - \theta_{out}) - Y\theta_{out}$$

depending respectively on whether the switch 20 is open or closed. In other words, $\theta_{out}$ will equal $\theta_{in}$ with the switch 20 open, and $\theta_{out}$ will equal $$\frac{X}{X-Y}\theta_{in}$$

with the switch 20 closed.

What the above means is this: Only where the displacement of the servo 22 output shaft is desired to be increased is a limitation placed on the nature of the gradients X and Y. For example, if the two gradients are equal, the expression $$\theta_{out} = \frac{X}{X-Y}\theta_{in}$$

will reduce to $\infty\theta_{in}$, and the feedback servo will, within limits, operate as an integrator. Therefore the gradient X may or may not equal the gradient Y, depending on the result desired.

Figure 2:
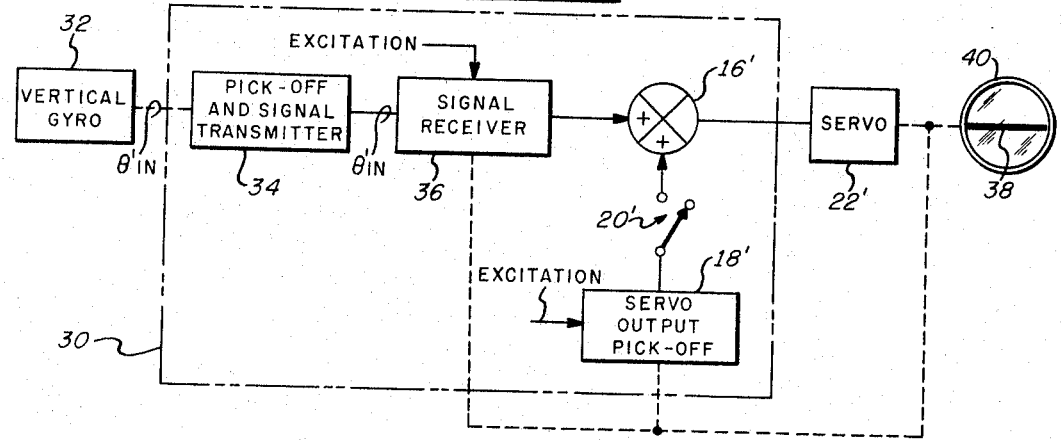
FIG. 2 is a block diagram of an indicator circuit employing the invention.

Referring now to FIG. 2, the circuit which is generally shown within the lines 30 of FIG. 1, is embodied in a form useful in conjunction with an attitude indicator for an aircraft. A vertical gyroscope 32 providing the input mechanical signal $\theta'_{in}$ has such signal converted to its electrical equivalent by a pick-off and signal transmitter 34. A signal receiver 36 receives the signal $\theta'_{in}$ and applies it to a summing circuit 16'. The output signal from the summing circuit 16' is applied to a servo 22' which in turn drives the indicating bar 38 of an indicator 40. With a switch 20' open, the servo 22' in positioning the bar 38 also provides a feedback signal $\theta'_{out}$ which cancels the signal $\theta'_{in}$ from the receiver 36, such receiver having a signal gradient of X volts for each degree of signal ($\theta'_{in} - \theta'_{out}$). A pick-off 18' produces a signal $\theta'_{out}$ representing the servo 22' output, such signal having a gradient of Y volts for each degree of servo output $\theta'_{out}$. How the apparatus of FIG. 2 operates can best be appreciated by an understanding of a presently preferred form of the invention, following.

Figure 3:
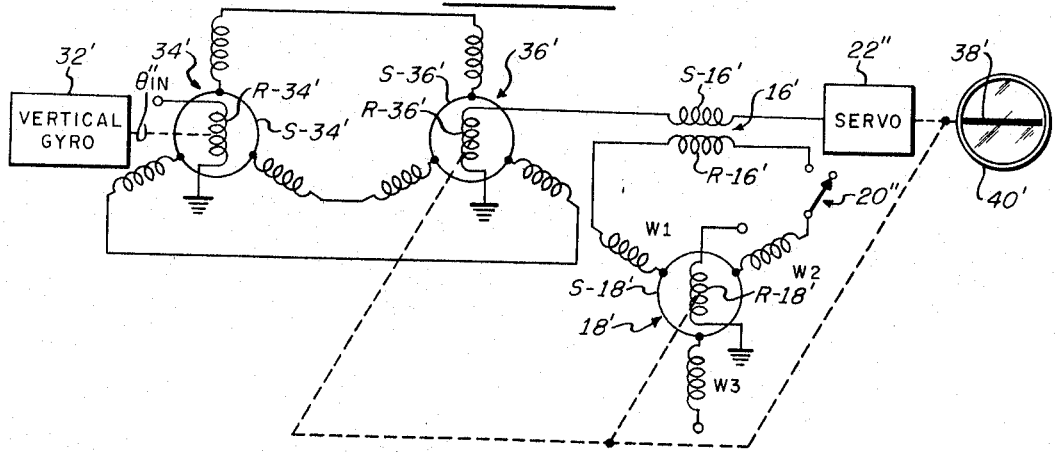
FIG. 3 is a schematic diagram of an indicator circuit embodying a presently preferred form of the invention.

Referring to FIG. 3 a vertical gyroscope 32' mechanically positions the rotor R-34' of a synchro transmitter 34' in proportion to the angular displacement $\theta''_{in}$ between the gyro sensitive element and the gyro case. Such rotor R-34' then induces a signal $\theta''_{in}$ in the form of a voltage vector into the windings of the stator S-34' of the transmitter 34'. The voltage vector is transmitted to the windings of the stator S-36' of a synchro receiver 36' employed as a control transformer. The voltage vector induced in the winding of the rotor R-36' of the synchro 36' is applied through the secondary winding S-16' of a transformer 16' to a servo 22''. The transformer 16' acts to sum vectorially the signal on the winding of the rotor R-36' with the signal on its primary winding P-16'.

The servo 22'' connects to and drives the bar 38' of a pitch attitude indicator 40'. In addition, the servo is adapted to drive the rotor R-36' in a direction to cancel the signal appearing on its winding, and also to position the rotor R-18' of a synchro transmitter 18'. The signal appearing across the sine windings W1 and W2 of the stator S-18' of the transmitter 18' is applied or not across the primary winding P-16' of the transformer 16' depending respectively on whether a switch 20'' is closed or not.

Operation: During cross country flight, i.e., while the switch 20 is open, the apparatus of FIG. 3 performs like any conventional indicator to indicate craft pitch attitude. That is, the gyro 32' in sensing pitch attitude changes causes signals to be applied to the servo 22'' which drives both the marker 38' and the rotor R-36' until the signal on the winding of the rotor R-36' is cancelled. Were the craft to have its pitch attitude changed from zero degrees to two degrees, a two-degree-representative signal would be applied to the servo 22'' which would drive until such signal were cancelled. During landing maneuvers where for tight control of a craft large displacements of the bar 38' for even small changes in pitch attitude are desired, the switch 20'' is closed. Hence, when the craft pitch attitude changes as above from zero to two degrees, the servo 22'' not only drives at first to cancel the signal apearing at its input (whereby the marker will move first to the position had above for a two degree pitch change), but in so doing causes a signal to be applied from the synchro transmitter windings W1 and W2 to the servo 22'' input. Therefore, as the signal $\theta''_{in}$ on the winding of the rotor R-36' goes to zero, a signal is developed at the servo 22'' input by virtue of the signal induced in the winding S-16' as the transmitter rotor R-18' is positioned. This results in the servo continuing to drive past its old null, i.e., when the switch 20'' was open, to a new null, such new null being reached when the signal induced in the winding of the rotor R-36' is $(-\theta''_{XY})$ and the signal induced in the transformer winding S-16' by the transmitter 18' is $(+\theta''_{XY})$, where the subscript XY is mentioned to indicate that the amount the servo 22'' drives for a given $\theta''_{in}$ is dependent on the signal per degree gradients of the elements 18' and 36'. Hence, during critical landing maneuvers, the display indication here appears magnified.

As noted above, many modifications of the present invention are possible. Of particular interest in conjunction with instrument indicators and the like though is the following modification: The switch 20'' (or 20 or 20') is adapted to remain closed usually and the transformer winding P-16' leads are switched (in the case of the apparatus of FIGS. 1 and 2 being so modified the elements 16 or 16', respectively, are changed to differential devices). Now, for cross country flight the indicator has a minimized displacement for an input signal $\theta''_{in}$, and during a landing maneuver, the switch 20'' (or 20 or 20′) is opened to allow the displacement to appear enlarged for a given craft pitch change $\theta''_{in}$.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A follow-up servomechanism of the type comprising a reference input member including means for providing a first signal proportional to the position of said reference member from a datum position, a servomotor for positioning an output member, and means driven by said servomotor for providing a second signal proportional to the position of said output member relating to said datum position, means for producing an error signal proportional to the difference between said first and second signals, and said servomotor being controlled in accordance with said error signal, whereby said output member is driven into positional correspondence with said input member as said error signal is nulled, wherein the improvement comprises means for varying the null position of said output member relative to said datum position for given positions of said input member relative to said datum position including, (a) a further signal generating means driven by said servomotor for providing a further signal proportional to the position of said output member relative to said datum position, and (b) means for combining said error signal and said further signal in predetermined ratios and for controlling said servomotor in accordance with said combined signal.

2. The follow-up servomechanism as set forth in claim 1 wherein said means for producing said first, second and error signals comprise a synchro transmitter positioned in accordance with said input member and a synchro control transformer the rotor of which is positioned by said servomotor, said further means includes a synchro transmitter having its rotor positioned by said sevomotor, and said combining means includes circuit means for coupling the stator windings of said last-mentioned synchro transmitter with the output of said control transformer.

3. The follow-up servomechanism as set forth in claim 2 wherein said input member comprises an aircraft gyroscopic pitch attitude reference device and said output member comprises a remote pitch attitude indicator whereby the magnitude of the indicated pitch attitude relative to the actual pitch attitude of the aircraft may be varied.

References Cited by the Examiner

UNITED STATES PATENTS

| | | | |
|---|---|---|---|
| 2,906,933 | 9/1959 | Magnin | 318—28 |
| 3,059,233 | 10/1962 | Guarino et al. | 340—27 X |

NEIL C. READ, *Primary Examiner.*

A. WARING, *Assistant Examiner.*